US012762515B2

(12) United States Patent
Tsai et al.

(10) Patent No.: US 12,762,515 B2
(45) Date of Patent: Oct. 13, 2026

(54) SYSTEMS AND METHODS FOR PRESENTING VEHICLE STATUS INFORMATION

(71) Applicant: Toyota Connected North America, Inc., Plano, TX (US)

(72) Inventors: David Tsai, Irvine, CA (US); Imad Zahid, Carrollton, TX (US); Shravanthi Denthumdas, Frisco, TX (US); Mark Anthony McClung, Celina, TX (US)

(73) Assignee: Toyota Connected North America, Inc., Plano, TX (US)

( * ) Notice: Subject to any disclaimer, the term of this patent is extended or adjusted under 35 U.S.C. 154(b) by 289 days.

(21) Appl. No.: 18/065,403

(22) Filed: Dec. 13, 2022

(65) Prior Publication Data

US 2024/0193552 A1 Jun. 13, 2024

(51) Int. Cl.

| | |
|---|---|
| ***G06Q 30/0601*** | (2023.01) |
| ***G06F 3/14*** | (2006.01) |
| ***G06Q 10/20*** | (2023.01) |
| ***G06V 20/50*** | (2022.01) |
| ***G06V 40/10*** | (2022.01) |

(52) U.S. Cl.

CPC .................................... *G06Q 10/20* (2013.01)

(58) Field of Classification Search

None

See application file for complete search history.

(56) References Cited

U.S. PATENT DOCUMENTS

| | | | | |
|---|---|---|---|---|
| 10,896,582 | B2 * | 1/2021 | Heathcote | G07F 17/329 |
| 11,847,895 | B2 * | 12/2023 | Gotlieb | G06Q 50/34 |
| 2009/0100118 | A1 * | 4/2009 | Pollock | G07C 15/005<br>708/250 |
| 2013/0325541 | A1 * | 12/2013 | Capriotti | G06Q 10/087<br>705/7.21 |
| 2019/0025905 | A1 * | 1/2019 | Godina | G06F 3/0488 |
| 2020/0401803 | A1 * | 12/2020 | Gilbert | G06T 11/60 |
| 2022/0012947 | A1 * | 1/2022 | Xie | G06T 19/006 |
| 2023/0074139 | A1 * | 3/2023 | Ghosh | B60W 50/04 |
| 2023/0154240 | A1 * | 5/2023 | Browne | G06T 19/00<br>701/29.4 |
| 2024/0087373 | A1 * | 3/2024 | O'Brien | G05B 23/0243 |
| 2025/0111754 | A1 * | 4/2025 | Roeygaard | G06Q 20/208 |
| 2026/0050901 | A1 * | 2/2026 | Roeygaard | G06Q 20/20 |

OTHER PUBLICATIONS

Faieza Abdul Aziz et al., Augmented Reality Marker Based to Aid Inspection and Maintenance Process in Automotive Industry, International Journal of Engineering and Advanced Technology (IJEAT), ISSN: 2249-8958 (Online), vol. 8 Issue-3S, Feb. 2019.

* cited by examiner

*Primary Examiner* — Florian M Zeender

(74) *Attorney, Agent, or Firm* — Dinsmore & Shohl LLP

(57) ABSTRACT

Systems and methods for presenting vehicle status information using a virtual vehicle in a virtual environment are disclosed. In one embodiment, a method of a method for presenting vehicle status information includes receiving vehicle data of a physical vehicle from one or more sources, wherein the vehicle data corresponds with one or more components of the physical vehicle, and causing for display a virtual vehicle within a virtual environment, wherein the virtual vehicle corresponds to the physical vehicle and an appearance of the virtual vehicle corresponds with the vehicle data of the one or more components of the physical vehicle.

20 Claims, 5 Drawing Sheets

SYSTEMS AND METHODS FOR PRESENTING VEHICLE STATUS INFORMATION

TECHNICAL FIELD

The present specification relates to vehicle repairs and, more particularly, to systems and methods for presenting vehicle status information using a virtual vehicle in a virtual environment.

BACKGROUND

Vehicles, such as cars and trucks, often need to be repaired or otherwise serviced. As an example, a vehicle is moved to a maintenance bay where it is worked on by one or more technicians.

A pain-point of having a vehicle repaired for the owner of the vehicle is knowing the current status of the vehicle repair. An owner must either wait in a waiting room or wait for a phone call letting the owner know when the vehicle is completed. Vehicle repairs can be lengthy, and significant delays may occur. Owners may become antsy and agitated when there are delays and they do not know the status of their repair, or when the repair will be completed.

Accordingly, a need exists for alternative methods of presenting vehicle status information for vehicles undergoing repair.

SUMMARY

In one embodiment, a method of a method for presenting vehicle status information includes receiving vehicle data of a physical vehicle from one or more sources, wherein the vehicle data corresponds with one or more components of the physical vehicle, and causing for display a virtual vehicle within a virtual environment, wherein the virtual vehicle corresponds to the physical vehicle and an appearance of the virtual vehicle corresponds with the vehicle data of the one or more components of the physical vehicle.

In another embodiment, a system for presenting vehicle status information includes one or more processors, and a non-transitory computer-readable medium storing instructions that, when executed by the one or more processors, cause the one or more processors to receive vehicle data of a physical vehicle from one or more sources, wherein the vehicle data corresponds with one or more components of the physical vehicle, and cause for display a virtual vehicle within a virtual environment, wherein the virtual vehicle corresponds to the physical vehicle and an appearance of the virtual vehicle corresponds with the vehicle data of the one or more components of the physical vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for presenting vehicle status information regarding a vehicle under repair. More particularly, embodiments of the present disclosure generate a virtual vehicle that represents the physical vehicle under repair in a virtual environment that a user can view using a display device, such as, without limitation, a virtual reality headset. Data regarding the physical vehicle are used to indicate changes to components of the physical vehicle that are reflected in the virtual vehicle. In this manner, a user of the system is able to watch the progress of the repair of the vehicle. The user is able to move around the virtual vehicle, look under the hood, move under the virtual vehicle, sit in the virtual vehicle, or take other actions to watch and inspect the progress being made on the repair of the vehicle.

In some embodiments, a user may correspond with a virtual technician, which may be represented by an avatar that exists in the virtual environment. The avatar of the virtual technician may provide information regarding the vehicle repair to the user. The virtual technician may be an automated technician (i.e., a "bot") or a representation of a real-life technician that is in a remote location. The avatar representing the virtual technician may switch between a bot and a real-life technician depending on the correspondence. For example, the avatar representing the virtual technician may start as a bot, and then transition to a real-life technician if the bot cannot answer questions presented by the user.

Various embodiments of systems and methods for presenting vehicle status information regarding a vehicle under repair are described in detail below.

Figure 1:
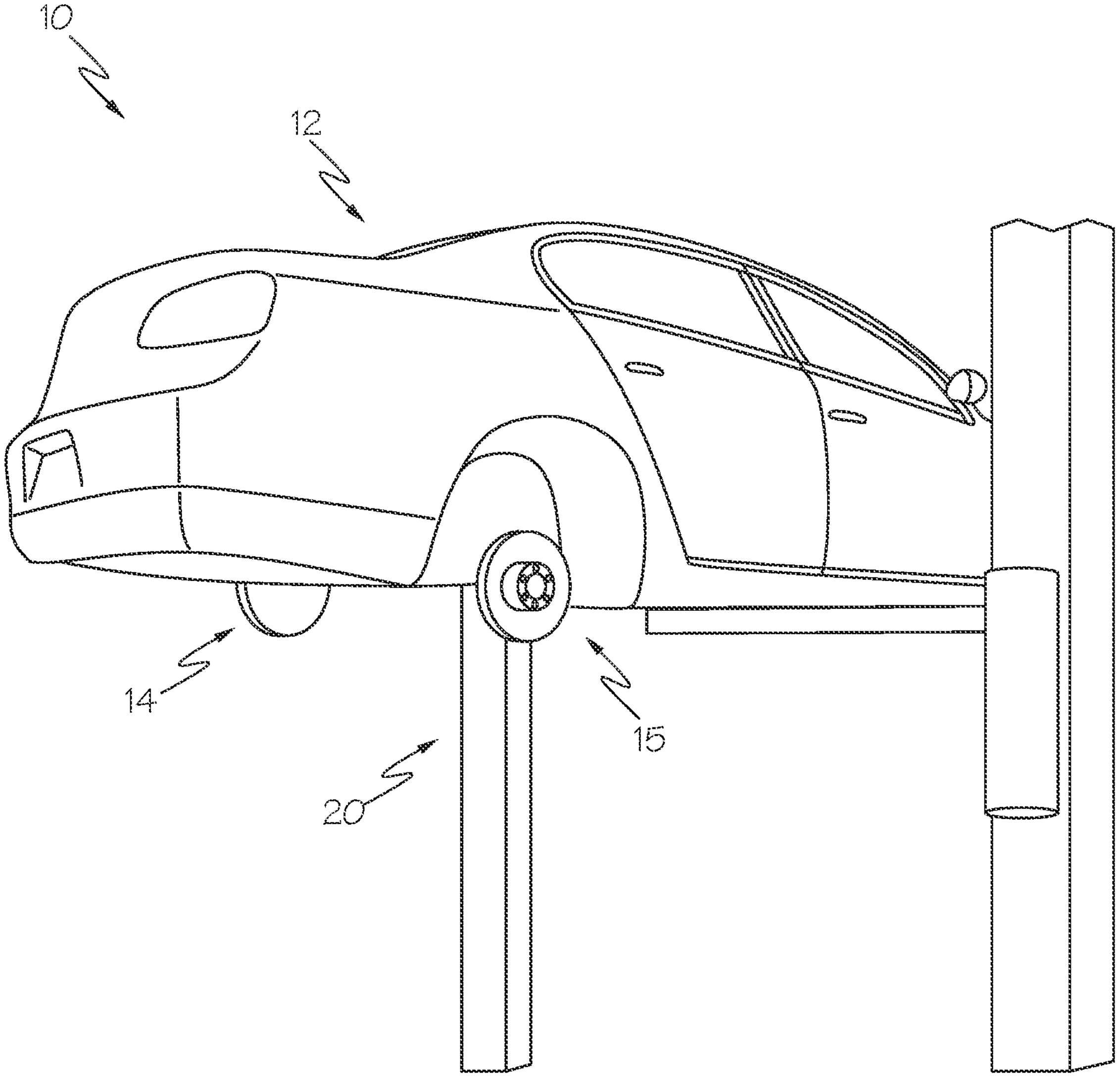
FIG. 1 illustrates an example physical vehicle under repair according to one or more embodiments described and illustrated herein.

Referring now to FIG. 1, an example physical vehicle 12 in an example maintenance bay 10 is schematically illustrated. The physical vehicle 12 is in the maintenance bay 10 to receive repairs. In the illustrated example, the physical vehicle 12 is raised by a lift 20 that enables one or more technicians to work under the physical vehicle 12, and perform tasks such as change or rotate tires. As shown in FIG. 1, the physical vehicle 12 has its two wheels removed, thereby exposing left and right rear axle hubs 14, 15.

The owner of the physical vehicle 12 is not near the physical vehicle, and may in fact be at a remote location, such as at his or her home or work location. Therefore, the owner cannot be updated regarding the status of the repair, or to see how the repair is proceeding. As described in more detail below, sensors of the physical vehicle 12, electronic control units of the physical vehicle 12, cameras, data entered into a computing device by a technician, and any other data sources may provide information regarding the current state of the repair of the physical vehicle 12. In the example of FIG. 1, rear tire pressure sensors (not shown) may be disconnected and not provide signals, which is indicative of the rear wheels being removed.

Figure 2:
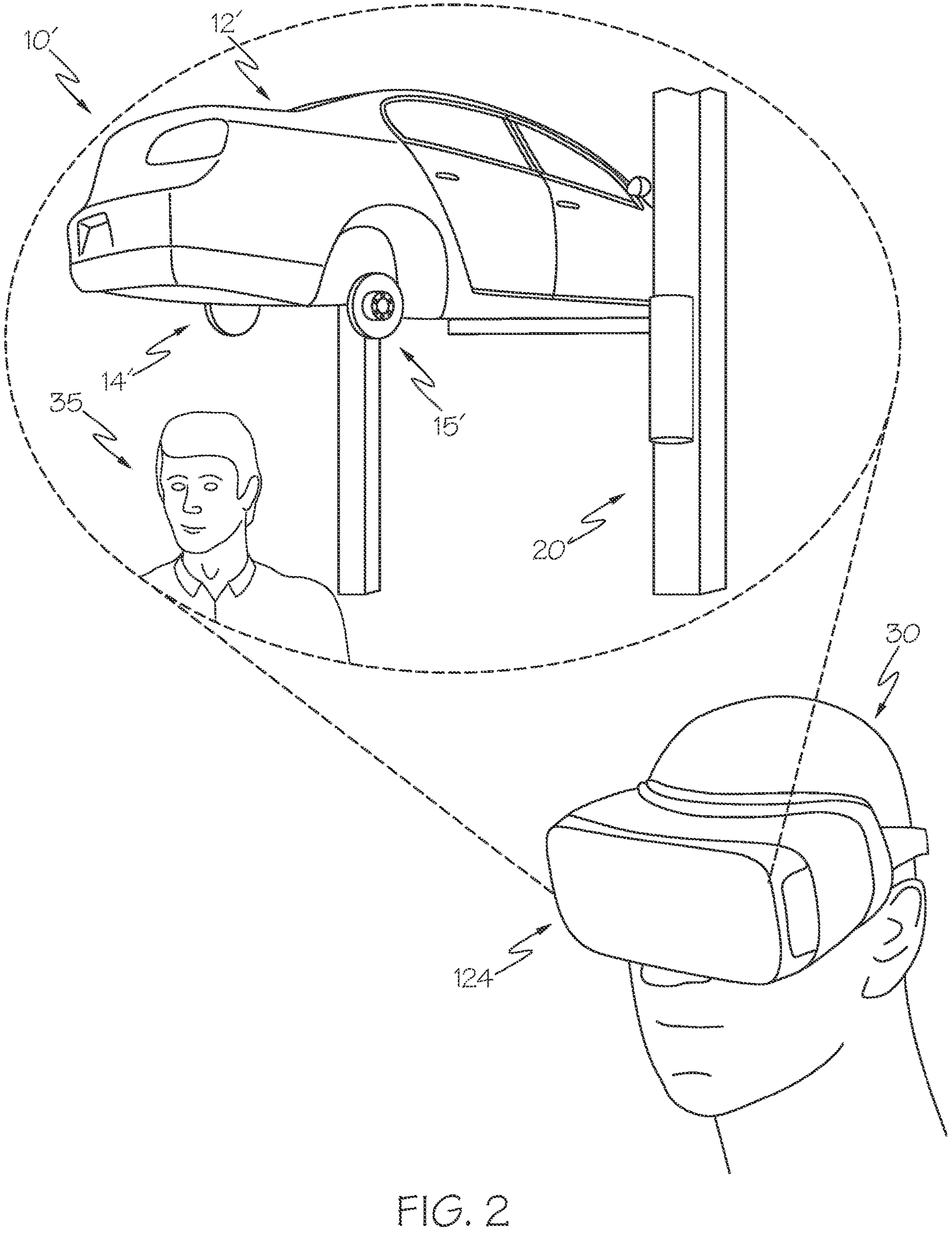
FIG. 2 illustrates an example user seeing a virtual vehicle representing the physical vehicle of FIG. 1 rendered in a virtual environment according to one or more embodiments described and illustrated herein.

FIG. 2 illustrates an example user 30 experiencing a virtual vehicle 12' in a virtual environment 10'. The user 30 utilizes a display device to experience the virtual vehicle 12' and the virtual environment 10'. In the illustrated example, the display device is a virtual reality headset 124. Any virtual reality headset 124 may be utilized. Other display devices include, but are not limited to augmented reality glasses or mobile devices operable to provide a virtual reality experience.

The virtual reality headset 124 renders the virtual vehicle 12' in a virtual environment 10'. The virtual vehicle 12' is a virtual representation of the physical vehicle 12 that is being repaired. Thus, the virtual vehicle 12' may look the same as the physical vehicle 12. Thus, the virtual vehicle 12' is the same make, model and year as the physical vehicle 12. In other embodiments, the virtual vehicle 12' may be a generic representation of the physical vehicle 12. However, a closer representation of the virtual vehicle 12' to the physical vehicle 12 may provide better information regarding the current status of the repair.

In the illustrated example, the virtual environment 10' includes a virtual lift 20' because the physical vehicle 12 is raised by the lift 20. The state and condition of the virtual vehicle 12' reflects the state and condition of the physical vehicle 12. Because the rear tires are removed from the physical vehicle 12, the rear tires are removed from the virtual vehicle 12', thereby exposing first and second axle hubs 14', 15'. As other examples, if the physical vehicle 12 is having its spark plugs replaced, the virtual vehicle 12' will be rendered such that the spark plugs are removed. If the physical vehicle 12 is having body work done, the virtual vehicle 12' will reflect the work, such as a front fender removed, or dents removed.

The user is able to move within the virtual environment 10' to view and inspect the virtual vehicle 12' from many different vantage points in a manner as if the user were in the maintenance bay walking around the physical vehicle 12. In embodiments, the user may walk around the virtual vehicle 12', go under the virtual vehicle 12', fly over the virtual vehicle 12', sit in the virtual vehicle 12', among others. In this manner, the user can inspect the virtual vehicle 12' and monitor the repair process.

In some embodiments, one or more icons, texts, or other graphical elements may indicate the overall progress of the repair. FIG. 2 illustrates a non-limiting progress bar 33 as a progress icon that provides a visual indication of the progress of the repair. The progress bar 33 may float within the virtual environment 10, or be provided in a menu area of the display (not shown). The progress bar 33 may be turned on or off. It should be understood that other information may also be displayed, such as text indicating what has been done and what still needs to be done.

In some embodiments, the user 30 has the option to communicate with a virtual technician 35. The virtual technician 35 may be represented by an avatar, such as the avatar shown in FIG. 2. In other embodiments, the virtual technician 35 may communicate with the user 30 by audio only without an avatar, or by use of a chat box. Other communication channels between the virtual technician 35 and the user 30 may be provided.

The virtual technician 35 can provide the user 30 with additional information regarding the status of the repair of the physical vehicle 12, such as what still needs to be done and what has been done. The user 30 can ask questions of the virtual technician 35. The avatar of the virtual technician 35 may give the user 30 a tour of the virtual vehicle 12' and explain what is going to be repaired and how it is going to be repaired.

The virtual technician 35 may be automated (i.e., a bot) or a real-life person in a remote location (e.g., a call center). In some embodiments, the virtual technician 35 transitions between a bot and a real-life person depending on the situation. For example, the virtual technician 35 may start out as a bot by providing general information about the repair, such as what will be done, how long the repair will take, and the like. For more detailed information, such as information in response to a user question, the bot may be replaced by a real-life person. The user 30 may or may not notice that a transition between bot and real-life person had occurred. Display and use of the virtual technician 35 may be optional, for example.

Figure 3:
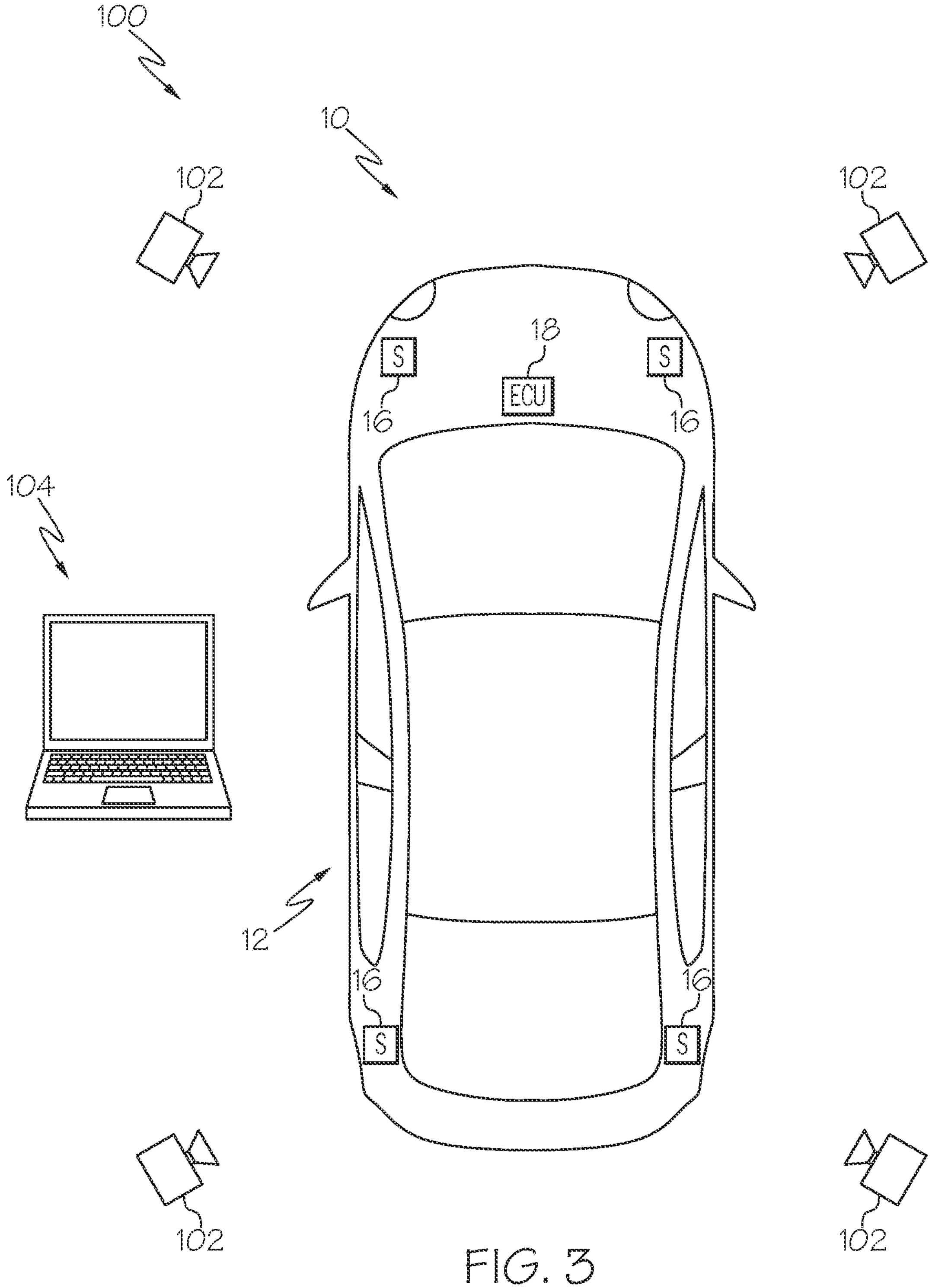
FIG. 3 illustrates an example physical vehicle and a plurality of sources of vehicle data according to one or more embodiments described and illustrated herein.

As stated above, the status of the physical vehicle 12 is reflected by the virtual vehicle 12'. Thus, any changes to the physical vehicle 12 are represented by the virtual vehicle 12'. The changes to the physical vehicle 12 are indicated by data from one or more sources of data. Thus, the vehicle data corresponds to components of the physical vehicle 12 (e.g., a door sensor corresponds with the door vehicle component). Referring now to FIG. 3, various sources of data are illustrated. The physical vehicle 12 has many sensors 16 that produce data depending on current conditions. FIG. 3 illustrates four sensors 16; however, it should be understood that many additional sensors may be provided and that four are provided for illustrative purposes. The sensors 16 may be any type of sensor, such as a door sensor, a trunk sensor, a hood sensor, a tire pressure sensor, a speedometer sensor, a tachometer sensor, a passenger detection sensor, a seatbelt sensor, among others. These sensors 16 provide signals representing data to the one or more processors of the physical vehicle 12, such as a vehicle electronic control unit 18. The data from the various sensors 16 may be read through the electronic control unit 18, for example. This data may be provided wirelessly, or read through a diagnostic port 19 of the physical vehicle by a diagnostic device. Thus, sensor data of the physical vehicle 12 may be read and received by the system generating the virtual vehicle 12' such that the virtual vehicle 12' reflects the state of the physical vehicle 12.

Other sources of data indicating the status of the physical vehicle 12 may include one or more cameras 102 having a field of view of the physical vehicle 12. The one or more cameras 102 may be disposed all around the physical vehicle 12 such that a 360-degree view of the physical vehicle 12 may be captured. Cameras 102 underneath and inside of the physical vehicle 12 may also be provided. It should be understood that in other embodiments, no cameras are provided, or only one camera 102 is provided. As a non-limiting example, a technician may place a single camera 102 proximate the physical vehicle 12 such that the camera 102 has a field of view of the physical vehicle 12 where the work will be performed (e.g., body work to the hood would have a single camera 102 focused on the hood).

The data sources may also include information entered into a computing device 104 by one or more technicians or other personnel. For example, as tasks of the repair are completed, a technician may record the completed tasks by entering information into the computing device 104. As a non-limiting example, the computing device 104 may display a graphical user interface displaying a list of tasks. A technician may select the tasks as they are completed to mark them done. This information can be provided to the system displaying the virtual vehicle 12' such that the status of the virtual vehicle 12' is updated and reflects the current state of the physical vehicle 12. Thus, any data source may be used to ensure that the virtual vehicle 12' reflects the physical vehicle 12.

Figure 4:
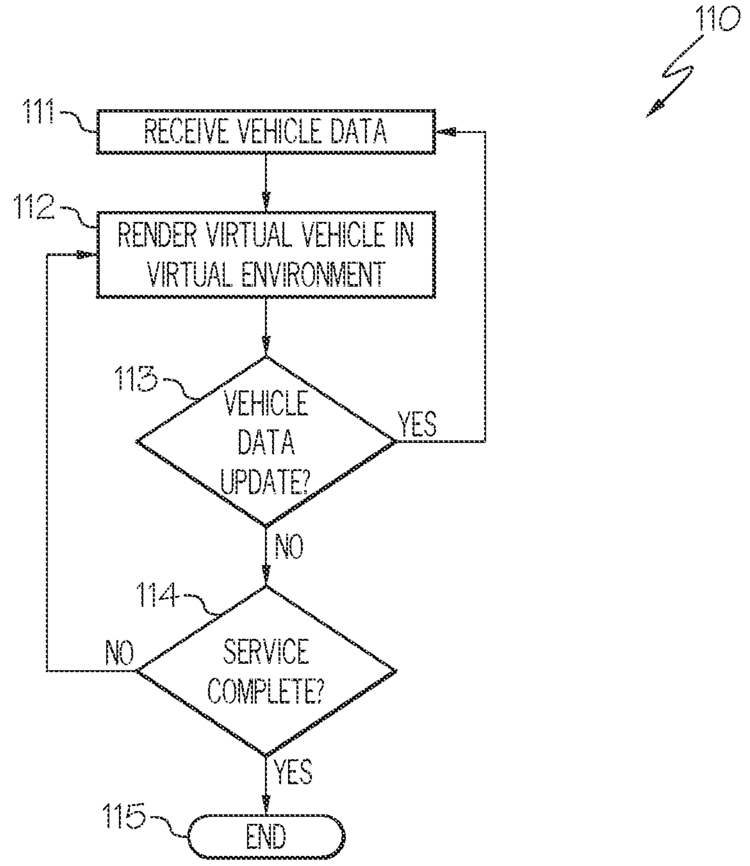
FIG. 4 illustrates a flowchart of an example method of presenting vehicle status information regarding a vehicle under repair.

Referring now to FIG. 4, a flowchart 110 illustrating a non-limiting method of presenting vehicle status information to a user is provided. At block 111, vehicle data is received by a computing device. This vehicle data may come from one or more sources, such as electronic control unit data that is gathered from physical vehicle sensors 16, one or more cameras 102, and data entered into a computing device 104 by a technician. Other sources for the vehicle data may also be utilized.

At block 112, a virtual vehicle 12' that represents the physical vehicle 12 is rendered in a virtual environment 10'. The virtual vehicle 12' and the virtual environment 10' may be viewed by a user by way of a display device, such as a virtual reality headset 124. The user may explore the virtual environment 10' and the virtual vehicle 12' using virtual reality headset 124 and any other virtual reality hardware. For example, the user may have an avatar that navigates the virtual environment 10' to view the current status of the virtual vehicle 12' and thus her physical vehicle 12.

At block 113 it is decided whether or not there has been a vehicle data update during the repair session. If there is, the workflow moves back to block 111 where the new data is received and then the virtual vehicle 12' rendering is updated at block 112. If there is no update, the workflow moves to block 114 where it is determined whether or not service has been completed. If service has not been completed, then the process moves back to block 112 where the virtual vehicle 12' is continued to be rendered. If service has been completed at block 114, then the process moves to block 115 where the process ends and the repair session is completed. At block 115 a summary of the work may be displayed, as well as a note indicating that the vehicle is ready to be picked up. In some embodiments, the user may continue to be able to view the virtual vehicle 12' that is rendered even after service has been completed.

Figure 5:
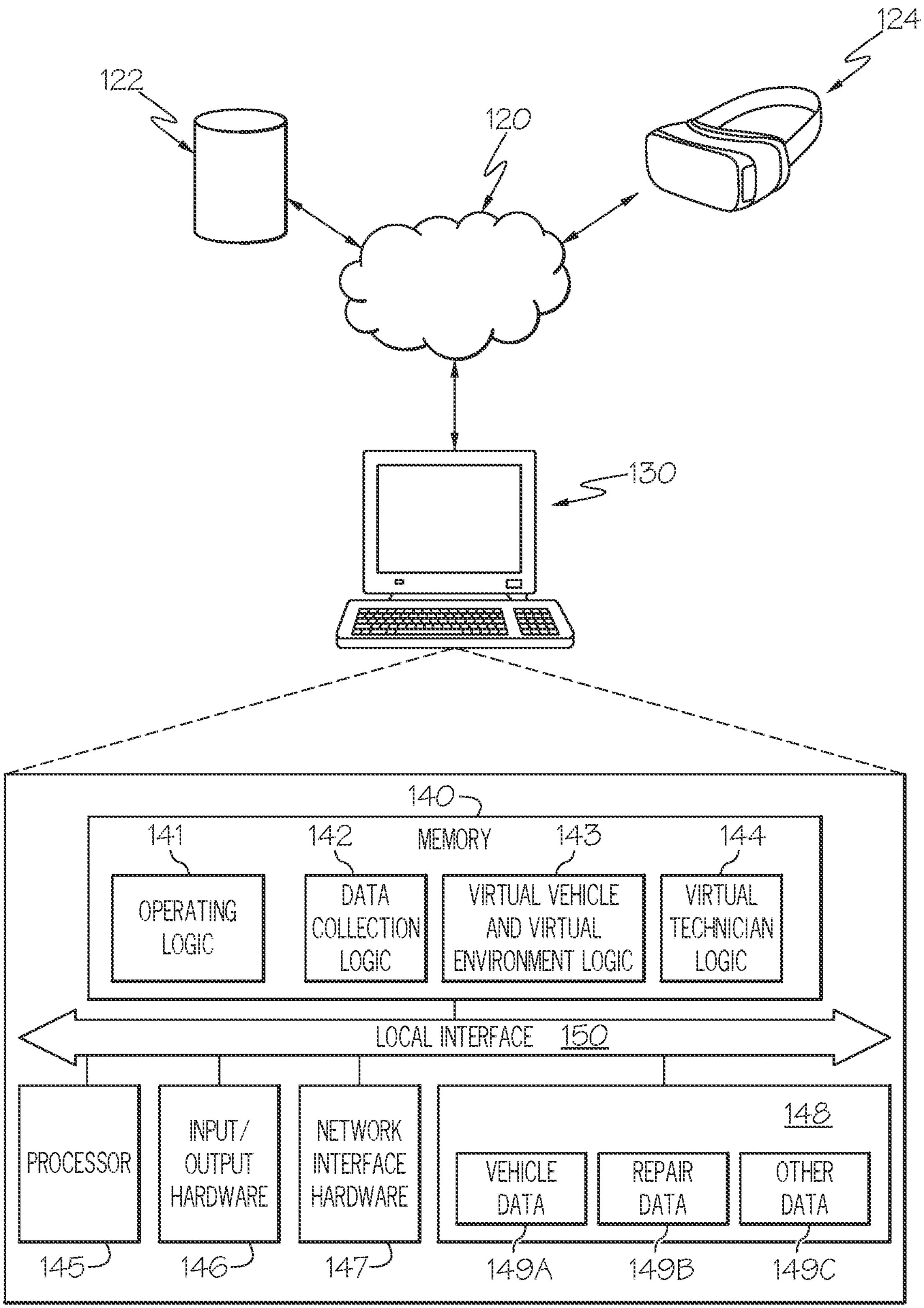
FIG. 5 illustrates an example system for presenting vehicle status information regarding a vehicle under repair.

Embodiments of the present disclosure may be implemented by a computing device, and may be embodied as computer-readable instructions stored on a non-transitory memory device. Referring now to FIG. 5, an example system for providing a virtual environment for rendering a virtual vehicle for monitoring a status of a physical vehicle under repair as a computing device 130 is schematically illustrated. The example computing device 130 provides a system for providing a virtual environment for rendering a virtual vehicle for monitoring a status of a physical vehicle under repair, and/or a non-transitory computer usable medium having computer readable program code for providing a virtual environment for rendering a virtual vehicle for monitoring a status of a physical vehicle under repair embodied as hardware, software, and/or firmware, according to embodiments shown and described herein. While in some embodiments, the computing device 130 may be configured as a general purpose computer with the requisite hardware, software, and/or firmware, in some embodiments, the computing device 130 may be configured as a special purpose computer designed specifically for performing the functionality described herein. It should be understood that the software, hardware, and/or firmware components depicted in FIG. 5 may also be provided in other computing devices external to the computing device 130 (e.g., data storage devices, remote server computing devices, and the like).

As also illustrated in FIG. 5, the computing device 130 (or other additional computing devices) may include a processor 145, input/output hardware 146, network interface hardware 147, a data storage component 148 (which may include recorded vehicle data 149A (e.g., data regarding the current state of the physical vehicle under repair), repair data 149B (e.g., data relating to the repair of the vehicle being undertaken), and any other data 149C for performing the functionalities described herein), and a non-transitory memory component 140. The memory component 140 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 140 may be configured to store operating logic 141, data collecting logic 142 for collecting data regarding work being performed, virtual vehicle and virtual environment logic 143 for generating the virtual vehicle and virtual environment, and virtual technician logic 144 for generating a virtual technician, as described herein (each of which may be embodied as computer readable program code, firmware, or hardware, as an example). It should be understood that the data storage component 148 may reside local to and/or remote from the computing device 130, and may be configured to store one or more pieces of data for access by the computing device 130 and/or other components.

A local interface 150 is also included in FIG. 5 and may be implemented as a bus or other interface to facilitate communication among the components of the computing device 130.

The processor 145 may include any processing component configured to receive and execute computer readable code instructions (such as from the data storage component 148 and/or memory component 140). The input/output hardware 146 may include virtual reality headset, graphics display device, keyboard, mouse, printer, camera, microphone, speaker, touch-screen, and/or other device for receiving, sending, and/or presenting data. The network interface hardware 147 may include any wired or wireless networking hardware, such as a modem, LAN port, wireless fidelity (Wi-Fi) card, WiMax card, mobile communications hardware, and/or other hardware for communicating with other networks and/or devices. The network interface hardware 147 may communicate via the Internet to receive vehicle data 122 provided from one or more sources as well as communicate with a display device, such as virtual reality headset 124 to display the virtual vehicle and virtual environment.

Included in the memory component 140 may be the operating logic 141, data collection logic 142, virtual vehicle and virtual environment logic 143, and virtual technician logic 144. The operating logic 141 may include an operating system and/or other software for managing components of the computing device 130. The operating logic 141 may also include computer readable program code for displaying the graphical user interface used by the user to view and experience a virtual environment. Similarly, the data collection logic 142 may reside in the memory component 140 and may be configured to receive and store vehicle data 122 from one or more sources of vehicle data. The virtual vehicle and virtual environment logic 143 also may reside in the memory component 140 and may be configured to render the virtual vehicle and virtual environment for display on a virtual reality headset 124. The virtual technician logic 144 includes logic to generate a virtual technician and establish a communication channel between the user and the virtual technician.

The components illustrated in FIG. 5 are merely exemplary and are not intended to limit the scope of this disclosure. More specifically, while the components in FIG. 5 are illustrated as residing within the computing device 130, this is a non-limiting example. In some embodiments, one or more of the components may reside external to the computing device 130.

It should now be understood that embodiments of the present disclosure are directed to systems and methods for presenting vehicle status information about a vehicle that is under repair. Vehicle data regarding the vehicle under repair is received and stored. The vehicle data includes information regarding any vehicle components that are being repaired. Embodiments use the vehicle data to render a virtual vehicle that reflects the current state of the vehicle under repair. The virtual vehicle is rendered in a virtual environment that can be explored by a user. The user can see vehicle repair updates to her vehicle and therefore have an understanding regarding the current status of the repair and how much more time is needed before the repair is completed. In some embodiments, a virtual technician is displayed that can provide information regarding the vehicle and the repair. The user can ask the virtual technician questions about the repair to get additional information.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for presenting vehicle status information, the method comprising:

receiving vehicle data of a physical vehicle from one or more sources, wherein the vehicle data corresponds with one or more components of the physical vehicle, and the one or more sources comprise vehicle sensors installed on the one or more components;

rendering, using a virtual reality headset, a virtual vehicle comprising one or more virtual components within a virtual environment, wherein the virtual vehicle corresponds to the physical vehicle and an appearance of the virtual vehicle corresponds with the vehicle data of the one or more components of the physical vehicle, and the one or more virtual components represents the one or more components of the physical vehicle;

determining, based on the vehicle data, whether an individual component of the one or more components is removed from the physical vehicle or installed on the physical vehicle;

in determining that the individual component is removed from the physical vehicle, rendering, using the virtual reality headset, an exposed component that is blocked by the individual component, wherein the exposed component is one or more virtual components; and causing for display a vehicle status information of at least one virtual component inspected by a user from a vantage point in the virtual environment, wherein the vehicle status information is determined based on the individual component removed from the physical vehicle or installed on the physical vehicle.

2. The method of claim 1, wherein the virtual vehicle within the virtual environment is displayed on a virtual reality headset.

3. The method of claim 1, wherein the vehicle data of the physical vehicle is received during a repair session that repairs the physical vehicle.

4. The method of claim 1, wherein the individual component is a tire, and the exposed component is an axle hub.

5. The method of claim 1, wherein the one or more sources comprises an electronic control unit of the physical vehicle.

6. The method of claim 1, wherein the one or more sources comprises a computing device.

7. The method of claim 1, wherein the one or more sources comprises one or more cameras having a field of view of the physical vehicle.

8. The method of claim 1, further comprises causing for display a progress icon indicating a progress of a vehicle repair.

9. The method of claim 1, further comprising:

receiving a request to communicate with a virtual technician;

causing for display an avatar representing the virtual technician; and providing a communication channel between a user and the virtual technician.

10. The method of claim 1, wherein the virtual vehicle is displayed such that a user is able to move around the virtual vehicle within the virtual environment to inspect changes being made to the virtual vehicle and the physical vehicle.

11. A system for presenting vehicle status information, the system comprising:

one or more processors; and a non-transitory computer-readable medium storing instructions that, when executed by the one or more processors, cause the one or more processors to:

receive vehicle data of a physical vehicle from one or more sources, wherein the vehicle data corresponds with one or more components of the physical vehicle, and the one or more sources comprise vehicle sensors installed on the one or more components;

render, using a virtual reality headset, a virtual vehicle comprising one or more virtual components within a virtual environment, wherein the virtual vehicle corresponds to the physical vehicle and an appearance of the virtual vehicle corresponds with the vehicle data of the one or more components of the physical vehicle, and the one or more virtual components represents the one or more components of the physical vehicle;

determine, based on the vehicle data, whether an individual component of the one or more components is removed from the physical vehicle or installed on the physical vehicle;

in determining that the individual component is removed from the physical vehicle, render, using the virtual reality headset, an exposed component that is blocked by the individual component, wherein the exposed component is one or more virtual components; and cause for display a vehicle status information of at least one virtual component inspected by a user from a vantage point in the virtual environment, wherein the vehicle status information is determined based on the individual component removed from the physical vehicle or installed on the physical vehicle.

12. The system of claim 11, wherein the virtual vehicle within the virtual environment is displayed on a virtual reality headset.

13. The system of claim 11, wherein the vehicle data of the physical vehicle is received over a course of a repair session that repairs the physical vehicle.

14. The system of claim 11, wherein the one or more sources comprises an electronic control unit of the physical vehicle.

15. The system of claim 11, wherein the one or more sources comprises a computing device operable to receive information from a technician.

16. The system of claim 11, wherein the system comprises one or more cameras having a field of view of the physical vehicle such that the one or more sources comprises the one or more cameras.

17. The system of claim 11, wherein the computer-readable instructions further causes the one or more processors to cause for display a progress icon indicating a progress of a vehicle repair.

18. The system of claim 11, wherein the computer-readable instructions further cause the one or more processors:

receiving a request to communicate with a virtual technician;

causing for display an avatar representing the virtual technician; and providing a communication channel between a user and the virtual technician.

19. The system of claim 11, wherein the virtual vehicle is displayed such that a user is able to move around the virtual vehicle within the virtual environment to inspect changes being made to the virtual vehicle and the physical vehicle.

20. The system of claim 11, wherein the individual component is a tire, and the exposed component is an axle hub.

* * * * *